March 4, 1952  A. P. DAVIS ET AL  2,588,213
REMOTE CONTROL APPARATUS
Filed Dec. 12, 1936  3 Sheets-Sheet 2
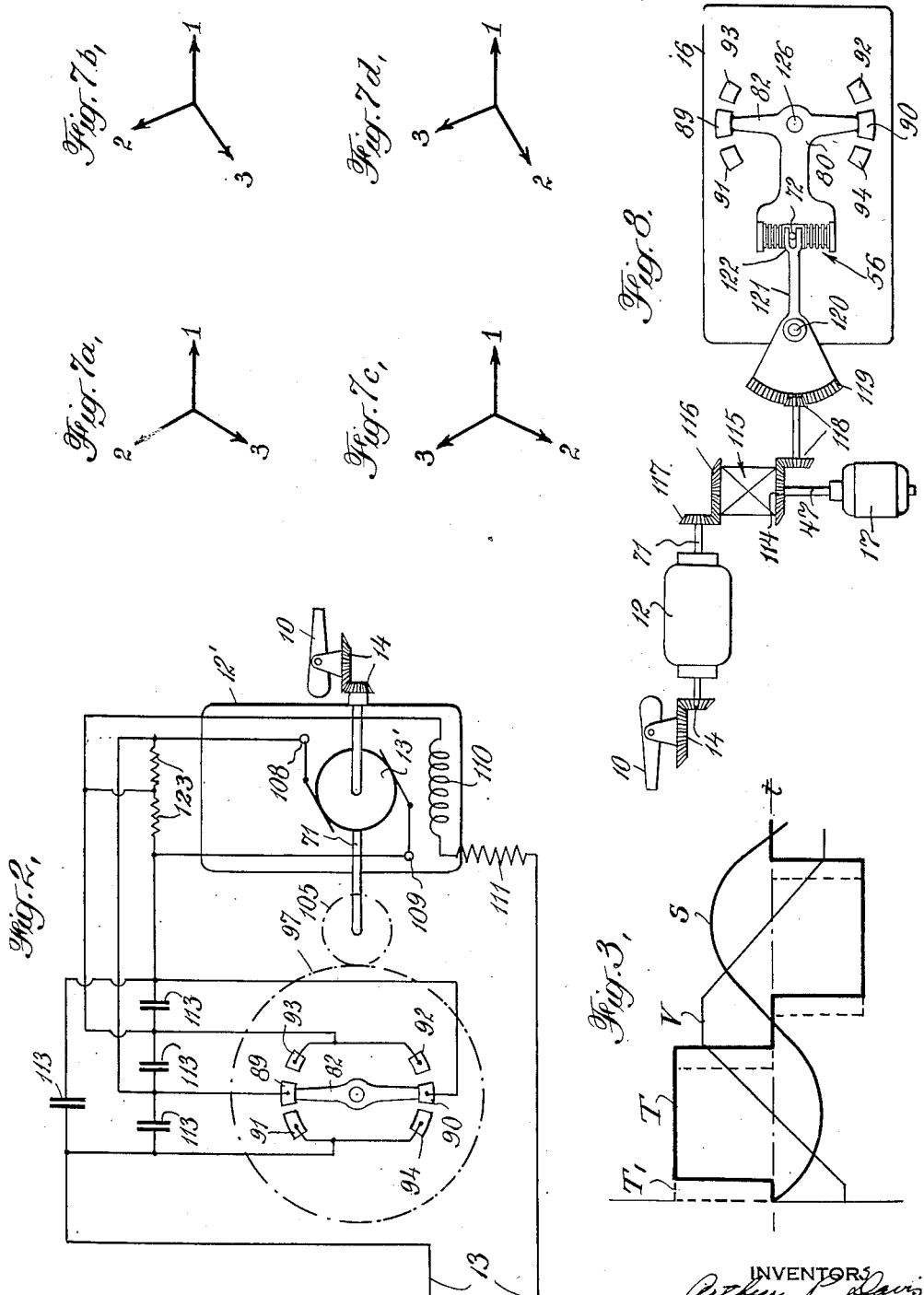
INVENTORS
Arthur P. Davis
and George Ogens
BY
ATTORNEYS

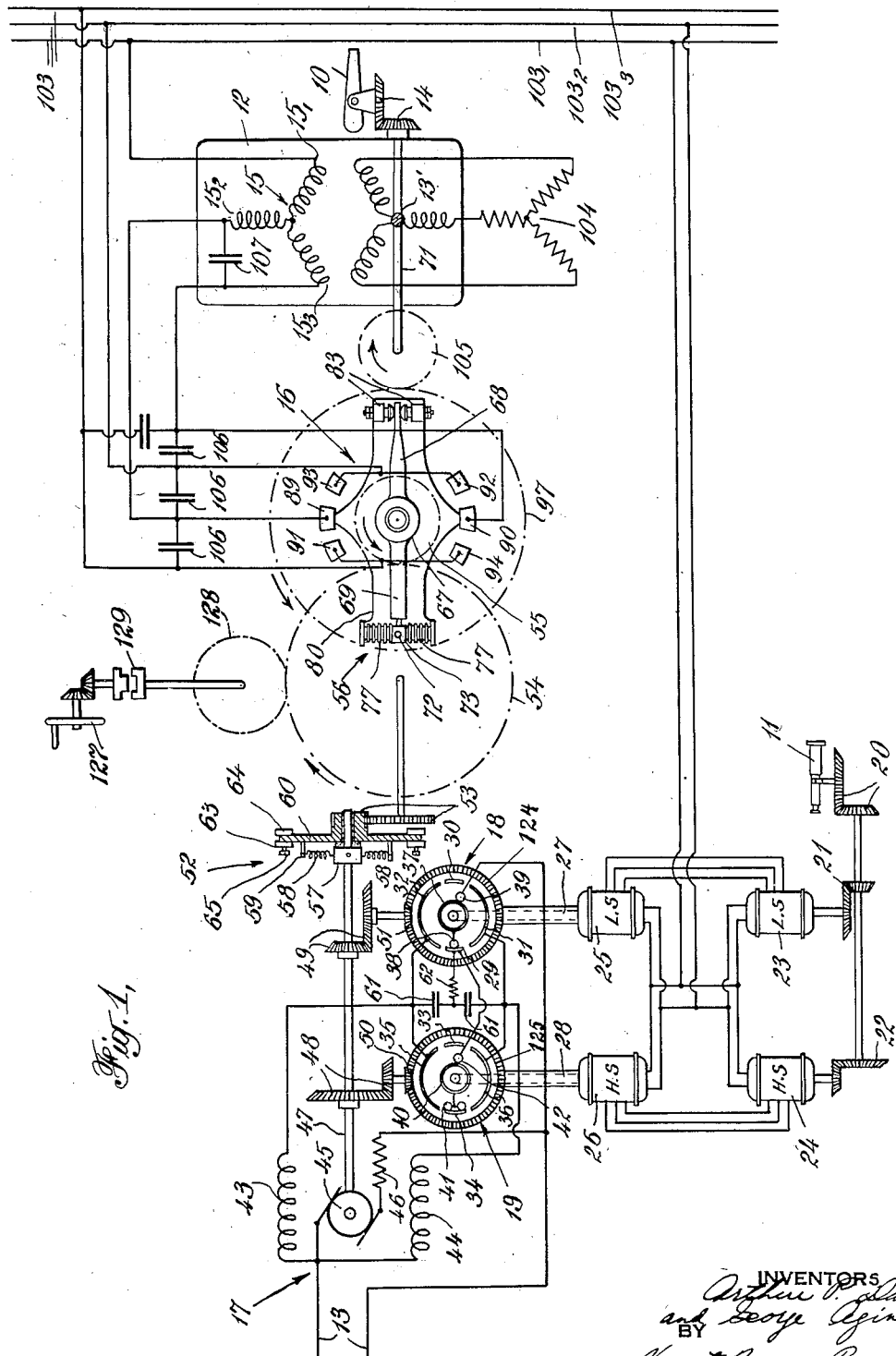

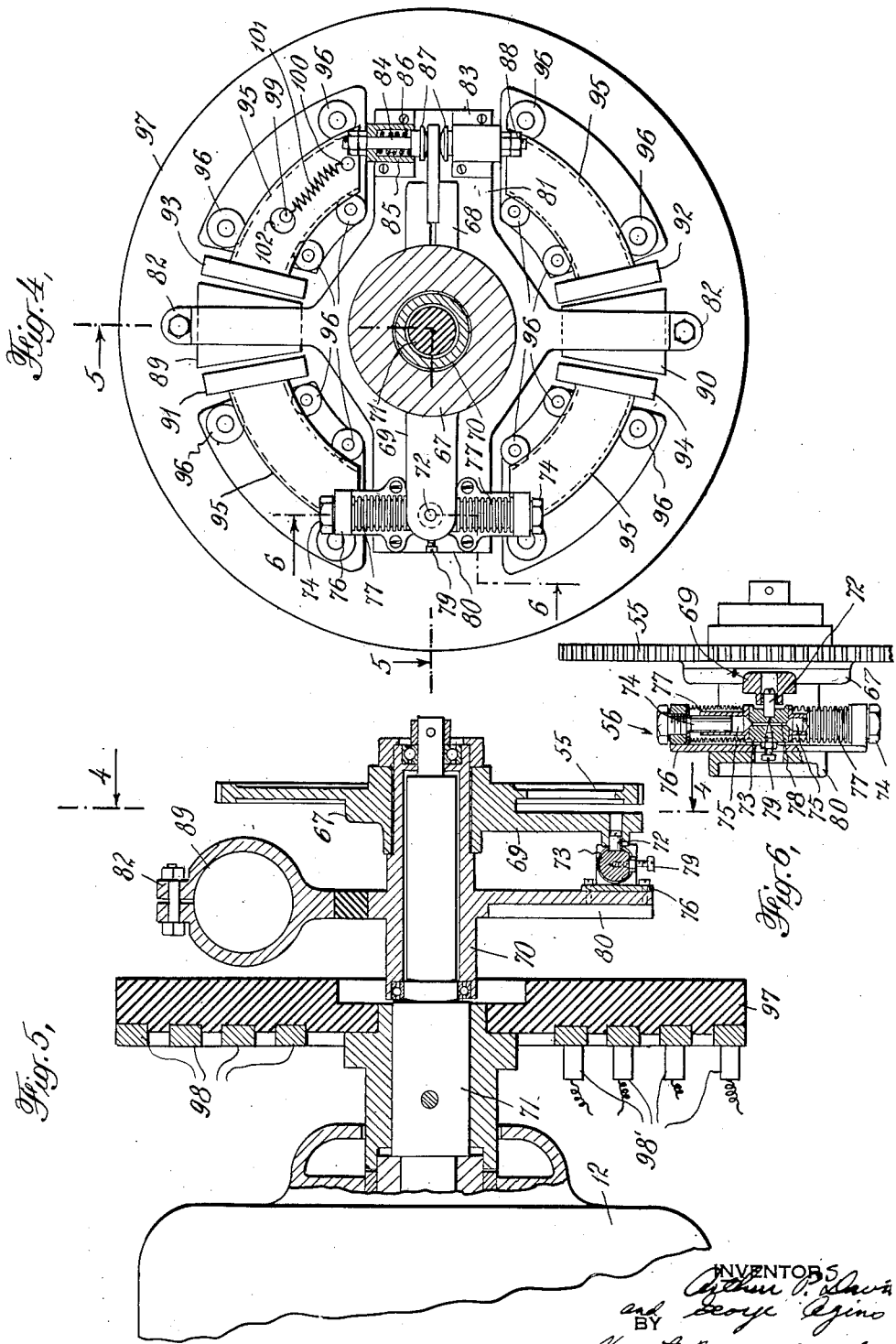

Patented Mar. 4, 1952

2,588,213

UNITED STATES PATENT OFFICE 2,588,213

REMOTE CONTROL APPARATUS

Arthur P. Davis, New York, and George Agins, Brooklyn, N. Y., assignors to Arma Corporation, a corporation of New York Application December 12, 1936, Serial No. 115,488

23 Claims. (Cl. 318—31)

This invention relates to control systems and has particular reference to follow-up control systems in which a local or remote controlled element may be instantaneously driven at a rate of speed and through a distance or angle corresponding to the rate and extent of movement of a controlling element.

The follow-up systems in general use, especially those adapted for heavy duty work, are complicated and expensive and where a relatively high degree of accuracy is required, the sensitivity necessary to gain such accuracy is accompanied by objectionable hunting of the controlled element. Such systems usually employ sensitive but delicate electronic valve arrangements which are likely to get out of order. All of the advantages of electronic follow-up control systems are realized in the system of the present invention while eliminating their disadvantages to the end that a rugged, simple, inexpensive and non-hunting system is provided, which is readily adaptable to various industrial uses where it is desired to accurately and rapidly position one or more light or heavy controlled elements in accordance with the movements of a local or remote controlling element.

The control system of the present invention includes a reversing switching mechanism, one member of which is driven by a relatively low torque pilot motor controlled by the controlling element, and the other member of which is operatively connected to a relatively high torque driving motor controlled by the switching mechanism and driving the controlled element, this driving motor being so connected to the switching mechanism that the corresponding switch member is driven in the same direction that the other switch member is driven by the pilot motor. As long as the two switch members of the switching mechanism remain in engagement, the controlled element will be driven at the same rate and will follow the controlling element, but if there is a change in relative speeds the reversing switching mechanism will first break and then instantly restore the control circuit, usually by engaging the reversing contacts, in accordance with the rate or direction of movement of the pilot motor, thus maintaining the controlled element in positional agreement with the controlling element.

The pilot motor may be either of the alternating or direct current reversible type, whose acceleration is less than that of the driving motor in order to prevent dragging by the pilot motor, and the reversing of the pilot motor is controlled in accordance with any reversing or speed change movement of the controlling element by suitable switching means, such as rotary induction apparatus for actuating high and low speed switches for appropriately controlling the energization of the field coils of the pilot motor. Damping is effected by simple means, located in the connections between the pilot and driving motors, causing the restoring torque to be applied so as to lead in phase by more than 180° and less than 270° the displacement of the oscillating member, so that there is no hunting.

It will be seen that a very sensitive and accurate following movement without hunting is obtained by the simple and durable electro-mechanical control system of the present invention, without the use of complicated electrical circuits, electronic valves, or involved mechanism. Because mechanical as well as electrical coupling is employed between the controlling and the controlled elements, they remain in synchronism so that no low speed control is required for the power follow-up. The system is equally adaptable to alternating and direct current service for reproducing the movement of any controlling element such as a handwheel, lever, telescope and the like, or for adjusting a remote controlled element in accordance with impulses developed by photo-electric devices, thermostats, valves, floats, air or fluid flow meters and apparatus, and the like.

For a more complete understanding of the invention, reference may be had to the accompanying drawings, in which:

Figure 1 is a schematic diagram of the control system of this invention as adapted to alternating current service;

Fig. 2 illustrates schematically the adaptation thereof to the control of a direct current or series alternating current motor;

Fig. 3 is a theoretical graphic analysis of the damped system;

Fig. 4 is a face view of a preferred embodiment of the reversing switching mechanism;

Fig. 5 is an axial section therethrough as seen along the line 5—5 of Fig. 4;

Fig. 6 is a fragmentary section through the dash-pot damping device as seen along the line 6—6 of Fig. 4;

Figs. 7a, 7b, 7c and 7d are vector diagrams illustrating the phase relationship of the current through a three-phase driving power motor; and Fig. 8 is a diagrammatic illustration of an adaptation of the control system employing a mechanical differential.

Merely by way of illustrating one adaptation of the control system of this invention, the controlled element 10 is illustrated as a gun mount while the controlling element is illustrated as a telescope, both elements being adjustable in train. It is of course understood that the invention is applicable to innumerable uses, some of which have been mentioned. In Fig. 1 the gun mount 10 is driven by a suitable power motor, such as the three-phase motor 12 connected thereto by suitable gearing 14.

Two phases, 15₂ and 15₃ of the three-phase stator winding 15 of driving motor 12 are energized by a reversing switch generally designated 16, which is actuated by a pilot motor 17, of a suitable alternating or direct current reversible type, such as that illustrated in this instance as reversible by energizing either of its two field coils. For normal operating conditions, the acceleration of the driving motor 12 should be greater than that of the pilot motor 17 in order to prevent dragging by the pilot motor. The pilot motor is controlled by commutator switches 18 and 19 of respective low and high speed contact follow-up systems.

The remote controlling element, such as the telescope 11, is connected by suitable gearing 20, 21 and 22 to respective low speed and high speed transmitters 23 and 24, which are preferably of the self-synchronous induction type. Transmitters 23 and 24 are respectively connected to receivers 25 and 26, also of the self-synchronous induction type, the rotors of which are accordingly maintained in positional agreement with the rotors of the transmitters 23 and 24. The low and high speed commutator switches 18 and 19 are respectively controlled by the low and high speed receivers 25 and 26, by suitable connections between corresponding stators and rotors thereof, such as by concentric shafts 27 and 28. Gears 124 and 125 are journalled at the ends of the shafts of the respective stators of receivers 25 and 26. The gear 124 of low speed commutator switch 18 is provided with two opposed short segments 29 and 30 suitably insulated from two opposed long segments 31 and 32.

The gear 125 of high speed commutator switch 19 is similarly provided with two opposed short segments 33 and 34, which are insulated from two opposed long segments 35 and 36. Secured to low speed rotor shaft 27 is a slip ring 37 which is electrically connected through trolley or brush 38 to one of the outer segments 29, 30, 31 or 32, depending upon its angular position, while commutator ring 37 is electrically connected by trolley or brush 39 to one side of the supply line 13.

Similarly, commutator ring 40 of high speed commutator switch 19 is electrically connected through double contact trolley 41 to one or two of the outer segments 33, 34, 35 or 36, while the commutator ring 40 is electrically connected to segment 29 of low speed commutator switch 18 by brush 42. The two contacts of the double trolley 41 are so spaced in relation to the short segments 33 and 34 of high speed commutator switch 19 as to make the effective gap on either side of its central position very short.

Long segments 32 and 35 of respective low and high speed commutator switches 18 and 19 are electrically connected to one field coil 43 of pilot motor 17 while segments 31 and 36 are electrically connected to the reversing field coil 44 of pilot motor 17. Both field coils 43 and 44 are connected to one side of the supply line 13.

Armature 45 of pilot motor 17 is electrically connected to one side of the supply line 13 through resistance 46 while its other terminal is connected to the common terminal of field coils 43 and 44. The shaft 47 of pilot motor 17, through suitable gearing 48 and 50, drives the gear 125 of high speed commutator switch 19 in the same direction and through the same angle as previously made by the rotor shaft 28 and, through the gearing 49 and 51, drives the gear 124 of low speed commutator switch 18 in the same direction and through the same angle as previously made by the rotor shaft 27. The structure of such commutator switches is well known and need not be illustrated or described in detail. Condensers 61 with protective resistances 62 are connected across contacts for suppressing arcing.

When the controlled element, or gun 10, is in positional agreement with the controlling element, or telescope 11, the position of trolleys 38 and 41 is such that neither field winding 43 nor 44 of pilot motor 17 is energized and the pilot motor is stationary. If trolleys 38 and 41 engage respective segments 32 or 35, the field coil 43 is energized to cause pilot motor 17 to rotate in one direction, whereas if trolleys 38 and 31 engage respective engagements 31 or 36, the other field coil 44 is energized to cause pilot motor 17 to rotate in the reverse direction. Rotation of the pilot motor in this way causes actuation of the reversing switch 16 to which the pilot motor is connected by shaft 47 through a suitable mechanical filter 52 to gears 53, 54 and 55.

The mechanical filter 52 is employed to absorb irregularities in the input of pilot motor 17 and in one form may consist of a collar 57 secured to the shaft 47 and having connected thereto one end of a plurality of equally spaced radial helical springs 58, the opposite ends of which are connected to posts 59 fixed to a flange 60 of one of the gears 53, which is journalled on shaft 47, and meshes with the other of gears 53. Weights in the form of rings 63 and 64 are adjustably clamped to the flange 60 by means of screws 65, so that a predetermined increase in acceleration will cause a relative slip between the rings 63—64 and the flange 60, thus providing auxiliary damping. Other suitable mechanical filters may be employed with equal facility.

As is illustrated in Figs. 4 and 5, gear 55 is secured to a hub 67 having diametrically opposite radial arms 68 and 69 and journalled on the sleeve 70, which is in turn journalled on shaft 71 of the driving motor 12. Arm 69 is pivotally connected by lateral pin 72 to the movable valve block 73 of a dash-pot generally designated 56 and illustrated in partial section in Fig. 6. The two opposed pistons 74 are fixed to the opposite ends of a relatively fixed bracket 76 and fit closely within two corresponding cylinders 75 carried by movable valve block 73. The block 73 is flexibly suspended between the inner ends of two metallic bellows 77 secured at their opposite ends to bracket 76 and forming a tight, elastic enclosure for the piston and cylinder combination 74 and 75. Cylinders 75 contain oil or other fluid and valve block 73 is provided with a passage 78 connecting cylinders 75, the flow through this passage 78 being controlled by an adjustable throttling pin 79.

The bracket 76 is secured to an arm 80 formed integrally with or secured to sleeve 70. Sleeve 70 is also provided with a diametrically opposite arm 81 and two colinear arms 82 positioned at right angles to the arms 80 and 81 and which arms 69 and 68 respectively overlie as is shown in Fig. 4. Arm 81 is fitted with opposite limit stops 83 for the arm 68. These stops 83 each comprise a stud 84 slidably mounted within a housing 85 on arm 81 and urged outwardly by a coil spring 86, the tension of which is adjustable by means of nuts 88. The flanged heads 87 of studs 84 engage opposite sides of the reduced end of arm 68, the springs 86 serving to hold arm 68 in a central position and the face of housing 85 serving as a limit stop for each direction of movement of arm 68. Sleeve 70 is accordingly rotated by gear 55 through arm 69 and either dash-pot 56, depending upon the direction of rotation.

Arms 82 of sleeve 70 carry opposite contacts 89 and 90, which have a large contact surface and which are insulated from the arms 82, as is illustrated in Fig. 5. As sleeve 70 rotates in either direction, the corresponding contacts 89 and 90 move through a narrow gap or dead space and contact either contacts 91 and 92 in one direction or 93 and 94 in the other direction, these contacts also having correspondingly large contact surfaces. Contacts 91, 92, 93 and 94 are each carried by an arcuate support 95 in turn supported by rollers 96 on disc 97 secured to shaft 71 of the power driving motor 12. Collector rings 98 on the rear face of disc 97 serve to make electrical connections with proper brushes 98'.

At each contact support 95, a post 99 secured to disc 97 projects through a hole 102 in the contact support and is connected to one end of a coil spring 101, the other end of which is secured to a post 100 on support 95. This arrangement is illustrated in Fig. 4 as applied to contact 93 and with it each contact is maintained with its contact surface substantially parallel to the surface of cooperating contact 89 or 90 during rotation of disc 97, the tension of spring 101 resiliently holding contact 93 in position. The contacts 91 to 94 are so shaped and arranged about the center of rotation as to be insensitive to centrifugal forces of rotation and yet enough movement is provided to assure positive contact of both upper and lower contacts 89 and 90 of arm 82 with corresponding contacts 91, 92, 93 and 94.

For alternating current operation it has been found preferable to position one contact slightly in advance of the other, so that the pair of contacts 91 and 94 are displaced slightly unsymmetrically with respect to the corresponding opposite contacts, as illustrated in an exaggerated manner in Fig. 1. For direct current operation, an unsymmetrical arrangement of the contacts, as indicated in Fig. 2, is also desirable. If two equal resistors 123 are added as indicated, contact 91 is set closer to 89 than its cooperating contact 92 is to 90, and contact 94 is set closer to 90 than its cooperating contact 93 is to 89, results similar to those on A. C. operation are obtained. The contact first made causes one of the resistors 123 to be placed in series with the armature 13' and the other resistor in parallel with the first resistor and armature, thus reducing the torque on the first step.

Suitable electrical connections are made through slip rings 98 and brushes 98' between the contacts 89 to 94, the power source 103 and the driving motor 12, so that the latter is energized to rotate in one direction when one set of contacts is engaged, for example, 89 and 91, 90 and 92, and to rotate in the reverse direction when the other set of contacts is engaged, for example 89 and 93, 90 and 94. Disc 97 may be mounted directly on the shaft 71 of driving power motor 12, as indicated in Fig. 5, or may be geared to the shaft 71 of driving motor 12 by gear 105 meshing with the toothed periphery of disc 97, as indicated in Figs. 1 and 2. With either of these arrangements, disc 97 with its attached contacts 91, 92, 93, 94 is correspondingly rotated into positional agreement with arms 82 so that a follow-up movement is effected.

Three-phase connections to driving motor 12 are illustrated in Fig. 1 although it is to be understood that any polyphase motor may be employed with equal facility. In the arrangement shown, contacts 91 and 94 are connected to one phase $103_3$ of the three-phase supply 103, contacts 92 and 93 are connected to another phase $103_2$ of supply 103, contact 89 is connected to one phase $15_2$ of three-phase stator 15 of driving motor 12, contact 90 with another phase $15_3$ of stator winding 15, while the remaining phase $15_1$ of stator winding 15 is directly connected to the third phase $103_1$ of supply 103.

Resistances 104 are connected in Y relation with the windings of the three-phase rotor 13' of driving power motor 12 for the purpose of limiting the starting current and increasing the starting torque. Condensers 106 are connected across the several contacts 89 to 94 for supressing arcing, while condenser 107 is connected across the windings $15_2$ and $15_3$ of stator 15, as indicated, for the purpose of carrying sufficient split phase current to drive rotor 13' and disc 97 when only one set of contacts of reversing switch 16 is engaged. If condenser 107 were omitted, two phases of driving motor 12 might be energized continuously, causing the motor to overheat.

Fig. 2 illustrates the connections for a direct current or a series alternating current driving motor 12', the commutator and pilot motor connections being omitted in Fig. 2 in the interest of simplicity, but it will be understood that they are identical or equivalent to those illustrated in Fig. 1. In this arrangement, electrical connections are made between contact 89 and one terminal 108 of the armature 13' of driving motor 12', while contact 90 is connected to the other terminal 109. Contacts 92 and 93 are connected together and in series with the field coil 110 of motor 12' and a resistance 111 to one side of the supply line 13. Contacts 91 and 94 are connected together and to the other side of the supply line 13. Condensers 113 are provided across the contacts for the purpose of arc suppression.

In operation, with the controlling element 11 in positional agreement with the controlled element 10, the system is in its normal deenergized condition as illustrated in Figs. 1 and 2. Rotation of the controlling element 11, such as by hand, effects a corresponding multiplied rotation of the rotors of respective low speed and high speed transmitters 23 and 24, which results in an equal and substantially simultaneous movement of the rotors of respective low speed and high speed receiver motors 25 and 26. Double trolley 41 of high speed commutator switch 19 is accordingly displaced to engage either segment 35 or 36, depending upon the direction of rotation of the controlling element 11. This effects energization of the appropriate field coil 43 or 44 of pilot motor 17, causing the latter to rotate shaft 47 in the appropriate direction, and also connected gears 48 and 49 which effect rotation of the corresponding gears 125 and 124 until the corresponding high and low speed commutator switches 19 and 18 are again in their open positions.

The movement of pilot motor 17 is transmitted through shaft 47, gears 53 and 54, to gear 55 of reversing switch 16. If the rotation of the controlling element 11 is in a direction such as to cause gear 55 to rotate counterclockwise, arm 69 of gear 55 effects movement of arms 80 and 82 through the dash-pot mechanism 56 so that contacts 90 and 92 and 89 and 91 engage, thereby energizing driving motor 12 to rotate in a counter-clockwise direction and move controlled element 10 through the corresponding angle of movement initiated by the controlling element 11, so that element 10 is placed in positional agreement with elment 11. Disc 97 is also driven in a counter-clockwise direction so that positional agreement is maintained. On the other hand, if controlling element 11 is rotated in the opposite direction, so that gear 55 rotates clockwise, then arm 69 through dash-pot 56 correspondingly rotates arms 80 and 82 so that contacts 90 and 94, and 89 and 93 engage, thus energizing motor 12 for rotation in a clockwise direction.

In the event that the controlled element 10 for some reason is unable to follow rapid movements of the controlling element 11 so that the elements are displaced more than a permissible amount, trolley 38 of low speed commutator switch 18 will have been advanced to a point where it no longer makes contact with segment 29 and accordingly disconnects double trolley 41 of high speed commutator switch 19 from the supply line 13, so that the high speed commutator switch 19 becomes inoperative and control is assumed by low speed commutator switch 18. When angular correspondence between elements 10 and 11 is again approximated, trolley 38 is again moved into engagement with segment 29, so as to restore control to high speed commutator switch 19.

Where a three-phase driving motor 12 is employed as in the arrangement of Fig. 1, with counter-clockwise rotation so that contacts 90 and 91 are engaged, one phase 103₃ of the supply 103 is connected to the corresponding winding 15₂ of stator 15. As contacts 90 and 92 are also engaged under these conditions, another phase 103₂ of supply 103 is connected to the corresponding stator winding 15₃. Inasmuch as the remaining stator winding 15₁ is permanently connected to the third phase 103₁ of the supply 103, all three phases of stator winding 15 are thus energized to cause rotation of the driving motor 12 in the corresponding direction, say clockwise. Fig. 7a is a vectorial representation of the phase energization in stator winding 15 corresponding to the phases of supply just described.

With clockwise rotation of disc 97, contacts 89 and 93 are engaged to connect phase 103₂ of supply 103 with the corresponding winding 15₂ of stator 15, while the corresponding engagement of contacts 90 and 94 connects phase 103₃ of supply 103 with the corresponding winding 15₃ of stator 15, thus reversing the phase in two windings of stator 15 to cause reversal of rotation of driving motor 12 in a counter-clockwise direction. The vector diagram of Fig. 7c illustrates this phase relationship.

At the start of rotation in a counter-clockwise direction, when only one set of contacts are engaged, say contacts 89 and 91, corresponding windings 15₁ and 15₂ of stator 15 are directly energized, but not the third winding 15₃. However, condenser 107 causes split phase energization of the third winding 15₃, so that driving motor 12 is caused to rotate with reduced torque as before in a clockwise direction. This phase relation is illustrated diagrammatically by the vector diagram of Fig. 7b. Similarly, in the opposite direction, split phase energization of winding 15₂ of stator 15 causes rotation in a counter-clockwise direction, the phase relationship being illustrated in Fig. 7d.

Where a direct current or series alternating current driving motor 12' is employed, as illustrated in Fig. 2, the direction of rotation of the driving motor 12' is reversed by reversing the connections to the armature thereof. Thus, when contacts 89 and 93, 90 and 94 are in engagement, armature terminal 108 is connected to one side of the supply 13, whereas when contacts 89 and 91, 90 and 92 are in engagement, armature terminal 108 is connected to the other side of the supply 13.

Accordingly, the reversal of reversing switch 16 changes the direction of rotation of the driving motor 12 or 12' and thus of the controlled element 10, in both of the arrangements illustrated in Figs. 1 and 2. Follow-up movement is obtained so that the controlled element 10 is maintained in positional agreement with the controlling element 11 at all times.

In the event of an undamped vibration, the restoring force is dependent on the displacement and is opposite in sign. The phase of the velocity is 90° ahead of that of the displacement and if the oscillation is damped, there is an additional force dependent on the velocity and opposite in phase. This additional force leads that due to displacement by 90°, so that the resultant force leads that due to displacement by some amount less than 90°. Although the hunting oscillation of the follow-up system is not sinusoidal and the restoring force does not vary continuously with the displacement, nevertheless the problem may be analyzed in the same way, that is to say, the oscillation will be damped if the torque leads that due to displacement by some amount less than 90°.

Fig. 3 illustrates diagrammatically this relationship and is an approximate graphic analysis of an oscillation of the follow-up system, in which values of displacement, velocity and torque of the undamped system are plotted as ordinates against time as the abscissa. In Fig. 3, S designates displacement and is represented as a non-sinusoidal curve, T designates the restoring torque as a rectangular discontinuous curve, and V designates the velocity as a flat-topped curve. For the undamped oscillation shown, the torque T leads displacement S by 180° in phase. Thus, if a torque is applied which is less than 90° out of phase with the torque T and leading, as is indicated by the dotted curve T', damping will result.

This form of damping is realized in the present apparatus and may be explained conveniently if one cycle of oscillation is considered at the beginning of an attempted hunt. Referring to Figs. 4, 5 and 6, and assuming that gear 55 rotates in a counter-clockwise direction, contact arm 80 is moved through dash-pot connecting pin 72 until contacts 90 and 92, 89 and 91 engage. Disc 97, being caused to rotate in a counter-clockwise direction by the responsive energization of driving motor 12, will move the contacts away from arm 82 so that arm 82 then starts its return oscillation. Because of the braking action of the dash-pot mechanism 56, arm 82 will lag behind gear 55, so that upon reversal, i. e., in clockwise direction of rotation, arm 82 will lead gear 55. Contacts 90 and 94, 89 and 93 are accordingly engaged sooner than would be the case if the dash-pot mechanism 53 were not employed, and driving motor 12 is also energized to rotate in the reverse or clockwise direction at an earlier time, so that the restoring torque is applied earlier, that is, the torque is applied ahead of the clockwise return motion of arm 82 and also of pilot motor 17 and controlling element 11. This lead takes place for each subsequent reversal of motion, so that the resultant restoring torque leads the displacement torque by less than 90°, which is the proper condition to be established for effective damping, with the result that hunting is prevented.

A further adaptation of the control system of this invention is illustrated diagrammatically in Fig. 8, in which the pilot motor 17 is controlled as before but its shaft 47 drives one input of mechanical differential 115, while gear 116, the other input of the differential 115, is driven by gear 117 on the shaft 71 of driving power motor 12. The output gear 114 of the differential 115, through gears 118, causes toothed sector 119 to rotate about its pivot 120 through a slight angle in either direction, depending upon the difference between the angular inputs of shafts 47 and 71. Sector 119 is provided with an extension 121 having a fork 122 at its extremity, which engages pin 72 of dash-pot mechanism 53, so as to cause a corresponding movement of arm 82 carrying contacts 89 and 90 and pivoted at 123 on the reversing switch base 16 which is provided with the stationary contacts 91 to 94. inclusive, electrically connected as before. Reversal of switch 16 accordingly reverses the direction of rotation of driving motor 12 in the manner previously described.

With this simple electro-mechanical arrangement the controlled element 19 accurately and rapidly follows the controlling element 11. Also, with this arrangement, as with the arrangement of Figs. 1 and 2, no low speed control is required on the power follow-up because of the mechanical coupling between the controlling and controlled elements, which prevents them from getting out of synchronism.

It will be observed that in the event of power failure, the control of the center contacts 89, 90, by the controlling element, such as a handwheel 127 connected to gear 54 by pinion 128 through normally disengaged clutch 129 (Fig. 1), enables continued operation without requiring shifting of parts, closing of auxiliary switches, and the like. This advantage is due to the electromechanical coupling afforded by the mechanism of this invention. The only evidence of such power failure is that greater torque is required of the operator in moving the controlling handwheel or element.

While certain preferred embodiments of the invention have been illustrated and described herein, it is to be understood that the invention is not limited thereby but is susceptible of changes in form and detail within its scope.

We claim:

1. In a system including a controlling element and a controlled element governed thereby, the combination of a driving motor for said controlled element, a source of power, a switch having two sets of cooperating movable contacts directly controlling said motor, connections between one set of said contacts and said power source for controlling the initial operation of said motor, connections between the other set of said contacts and said power source for controlling the subsequent operation of said motor, driving connections between one contact of each set of contacts and said motor, operative connections between said controlling element and the other contact of each set of contacts, and damping means for regulating the relative movement between said contacts.

2. In a system including a controlling element and a controlled element governed thereby, the combination of a driving motor for said controlled element, a source of power, a switch having two sets of cooperating movable contacts directly controlling said motor, connections between one set of said contacts and said power source for controlling the initial operation of said motor, connections between the other set of said contacts and said power source for controlling the subsequent operation of said motor, driving connections between one contact of each set of contacts and said motor, operative connections between said controlling element and the other contact of each set of contacts, and damping means in at least one of said connections.

3. In a system including a controlling element and a controlled element governed thereby, the combination of a driving motor for said controlled element, a switch having two sets of cooperating movable contacts directly controlling said motor, driving connections between one contact of each set of contacts and said motor, operative connections between said controlling element and the other contact of each set of contacts, said sets of contacts being successively engageable to apply successive power impulses to said motor, and damping means in said last-named connections.

4. In a system including a controlling element and a controlled element governed thereby, the combination of a driving motor for said controlled element, a switch having two sets of cooperating movable contacts directly controlling said motor, driving connections between one contact of each set of contacts and said motor, a pilot motor controlled by said controlling element, and driving connections including damping means between said pilot motor and the other contact of each set of contacts, said sets of contacts being successively engageable to apply successive power impulses to said motor.

5. In a system including a controlling element and a controlled element governed thereby, the combination of a reversible driving motor for said controlled element, a reversing switch having two sets of cooperating movable contacts directly controlling said motor, driving connections between one set of contacts and said motor, a reversible pilot motor, means actuated by said controlling element for controlling said pilot motor in accordance with the direction of movement of the controlling element, and driving connections including damping means between said pilot motor and the other set of contacts.

6. In a system including a controlling element and a controlled element governed thereby, the combination of a reversible driving motor for said controlled element, a reversing switch having two sets of cooperating movable contacts directly controlling said motor, driving connections between one set of contacts and said motor, a pilot motor controlled by said controlling element, driving connections between said pilot motor and said other set of contacts, a first switch between said pilot motor and said controlling element and actuated by the latter, a second switch between said pilot motor and said controlling element and actuated by the latter, said second switch being responsive to a predetermined displacement between said elements for appropriating control of said pilot motor from said first switch, and damping means in at least one of said connections.

7. In a system including a controlling element and a controlled element governed thereby, the combination of a reversible driving motor for said controlled element, a reversing switch having two sets of cooperating movable contacts directly controlling said motor, driving connections between one set of contacts and said motor, a pilot motor controlled by said controlling element, driving connections between said pilot motor and the other set of contacts, said sets of contacts being successively engageable to apply successive power impulses to said motor, a second reversing switch controlling the direction of rotation of said pilot motor, and operative connections between said controlling element and said second reversing switch, whereby the pilot motor is caused to rotate in a direction corresponding to the direction of movement of said controlling element.

8. In a system including a controlling element and a controlled element governed thereby, the combination of a reversible driving motor for said controlled element, a reversing switch having two sets of cooperating movable contacts directly controlling said motor, driving connections between one set of contacts and said motor, a pilot motor controlled by said controlling element, driving connections between said pilot motor and the other set of contacts, said sets of contacts being successively engageable to apply successive power impulses to said motor, a pair of field windings for said pilot motor for effecting reversal in the direction of rotation thereof, a second reversing switch for selectively energizing said field windings, and operative connections between said controlling element and said second reversing switch, whereby the pilot motor is caused to rotate in a direction corresponding to the direction of movement of said controlling element.

9. In a system including a controlling element and a controlled element governed thereby, the combination of a reversible driving motor for said controlled element, a reversing switch controlling said motor and having two sets of cooperating movable contacts, driving connections between one set of contacts and said motor, a pilot motor controlled by said controlling element, driving connections between said pilot motor and the other set of contacts, said sets of contacts being successively engageable to apply successive power impulses to said motor, said one set of contacts being mounted in spaced position on a support rotated by said corresponding connections, and said other set of contacts being positioned between said one set of contacts and movable into variable engagement therewith in accordance with changes in direction and variations between the rate of rotation of said motors.

10. In a system including a controlling element and a controlled element governed thereby, the combination of a reversible driving motor for said controlled element, a reversing switch controlling said motor and having two sets of cooperating movable contacts, driving connections between one set of contacts and said motor, a pilot motor controlled by said controlling element, driving connections between said pilot motor and said other set of contacts, said one set of contacts being mounted in spaced position on a support rotated by said corresponding connections, and said other set of contacts being positioned between said one set of contacts and movable into variable engagement therewith in accordance with changes in direction and variations between the rate of rotation of said motors, and damping means in the connections between one motor and the corresponding set of contacts to prevent hunting.

11. In a system including a controlling element and a controlled element governed thereby, the combination of a reversible driving motor for said controlled element, a reversing switch controlling said motor and having two sets of cooperating movable contacts, driving connections between one set of contacts and said motor, a pilot motor controlled by said controlling element, driving connections between said pilot motor and said other set of contacts, said one set of contacts being mounted in spaced position on a support rotated by said corresponding connections, and said other set of contacts being positioned between said one set of contacts and movable into variable engagement therewith in accordance with changes in direction and variations between the rate of rotation of said motors, and a dashpot in the connections between one motor and the corresponding set of contacts to prevent hunting.

12. In a system including a controlling element and a controlled element governed thereby, the combination of a reversible driving motor for said controlled element, a reversing switch controlling said motor and having two sets of cooperating movable contacts, driving connections between one set of contacts and said motor, a pilot motor controlled by said controlling element, driving connections between said pilot motor and said other set of contacts, said one set of contacts comprising two pairs mounted in spaced relation on opposite sides of a center of rotation by said corresponding operative connections, said other set of contacts being positioned between said opposite pairs of contacts and mounted on opposite sides of said center of rotation by said corresponding operative connections, said sets of contacts being movable into engagement in accordance with changes in direction and variations between the rates of rotation of said motors.

13. In a system including a controlling element and a controlled element governed thereby, the combination of a polyphase driving motor for the controlled element, a source of polyphase power, a switch having two sets of relatively movable cooperating contacts directly controlling said motor, phase connections between one set of said contacts and said power source, different phase connections between the other set of said contacts and said power source, operative connections between said motor and one contact of each set of said contacts, and operative connections between said controlling element and the other contact of each set of contacts.

14. In a system including a controlling element and a controlled element governed thereby, the combination of a polyphase driving motor for the controlled element, a source of polyphase power, a reversing switch interposed between said motor and source and having two sets of relatively movable cooperating contacts, direct phase connections between certain of said contacts of one set and said source for effecting rotation of said motor in one direction, phase connections between other contacts of said one set and said source for effecting rotation of said motor in the opposite direction, and several operative connections between said elements and said two sets of contacts, said sets of contacts being successively engageable to apply successive power impulses to said motor.

15. In a system including a controlling element and a controlled element governed thereby, the combination of a polyphase driving motor for the controlled element, a source of polyphase power, a reversing switch interposed between said motor and source and having two sets of relatively movable cooperating contacts, direct phase connections between certain of said contacts of one set and said source for effecting rotation of said motor in one direction, phase connections between other contacts of said one set and said source for effecting rotation of said motor in the opposite direction, operative connections between said motor and said one set of contacts, and operative connections between said controlling element and said other set of contacts, said sets of contacts being successively engageable to apply successive power impulses to said motor.

16. In a system including a controlling element and a controlled element governed thereby, the combination of a polyphase driving motor for the controlled element, a source of polyphase power, a reversing switch interposed between said motor and source and having two sets of relatively movable cooperating contacts, direct connections between certain opposite contacts of one set and certain phases of said motor, means controlled by other contacts of said one set for providing split phase current, connections between said means and another phase of said motor, operative connections between said motor and one set of contacts, and operative connections between said controlling element and said other set of contacts.

17. In a system including a controlling element and a controlled element governed thereby, the combination of a polyphase driving motor for the controlled element, a source of polyphase power, a reversing switch interposed between said motor and source and having two sets of relatively movable cooperating contacts, direct connections between certain corresponding contacts of one set upon closure and two phases of said motor, direct connections between another phase of said motor and the corresponding phase of said source, means interposed between said two phases of said motor for providing split phase energization therefor upon closure of said certain contacts, operative connections between said motor and one set of contacts, and operative connections between said motor and said other set of contacts.

18. In a system including a controlling element and a controlled element governed thereby, the combination of a three-phase motor for driving said controlled element, a three-phase source, a direct connection between one phase of said motor and one phase of said source, a reversing switch having two sets of cooperating contacts, several connections between the other two phases of said motor and the corresponding two phases of said source, one set of said switch contacts being severally interposed directly in the last-named connections, a condenser interposed between the said two phases of said motor for providing split phase current, operative connections between said motor and one set of switch contacts, and operative connections between said controlling element and the other set of switch contacts.

19. In a system including a controlling element and a controlled element governed thereby, the combination of a reversible driving motor for said controlled element, a mechanical differential interposed between said motor and said controlling element, a source of power for said motor, a reversing switch interposed between said motor and said source of power, operative connections between the output of said differential and said switch whereby the motor is controlled in accordance with variations in the degree of movement of said motor and controlling element, and damping means in said connections.

20. In a system including a controlling element and a controlled element governed thereby, the combination of driving motor for said controlled element, a source of power, a switch having two sets of cooperating contacts, connections between one set of said contacts and said power source for controlling the initial operation of said motor, connections between the other set of said contacts and said power source for controlling the subsequent operation of said motor, operative connections between one contact of each set of said contacts and said motor, a mechanical connection between the other contact of each set of contacts and said controlling element, whereby the controlling element directly controls said switch, and damping means in at least one of said connections.

21. In a system including a controlling element and a controlled element governed thereby, the combination of a reversible driving motor for said controlled element, a reversing switch having two sets of cooperating contacts directly controlling said driving motor, a pilot motor controlled by said controlling element, mechanical connections between said pilot and driving motors and said reversing switch for actuating the latter, and damping means in at least one of said connections.

22. In a system including a controlling element and a controlled element governed thereby, the combination of a driving motor for said controlled element, a source of power, a reversing switch having two sets of contacts and interposed between said motor and said source, cross connections between one set of said contacts and the terminals of said motor for effecting the reversal thereof upon closure of the corresponding contacts, operative connections between said motor and one set of contacts, operative connections between said controlling element and said other set of contacts, and damping means in one of said connections.

23. In a system including a controlling element and a controlled element governed thereby, the combination of a reversible driving motor for said controlled element, a reversing switch controlling said motor and having two sets of cooperating movable contacts, driving connections between one set of contacts and said motor, a pilot motor controlled by said controlling element, driving connections between said pilot motor and said other set of contacts, a source of power for said pilot motor, a second reversing switch controlling the direction of rotation thereof, operative connections between said controlling element and said second switch, and damping means in at least one of said connections.

ARTHUR P. DAVIS.
GEORGE AGINS.

REFERENCES CITED

The following references are of record in the file of this patent:

UNITED STATES PATENTS

| Number | Name | Date |
|---|---|---|
| 935,327 | Routin | Sept. 29, 1909 |
| 1,343,188 | Tanner | June 8, 1920 |
| 1,559,525 | Murphy | Oct. 27, 1925 |
| 1,597,788 | Henderson | Aug. 31, 1926 |
| 1,651,852 | Trevor | Dec. 6, 1927 |
| 1,848,803 | Rabe | Mar. 8, 1932 |
| 1,850,780 | Sperry | Mar. 22, 1932 |
| 1,950,427 | Willink | Mar. 13, 1934 |
| 1,954,142 | Moffett | Apr. 10, 1934 |
| 2,015,183 | Hodgman | Sept. 24, 1935 |
| 2,025,122 | Poitras | Dec. 24, 1935 |
| 2,148,731 | Davis et al. | Feb. 28, 1939 |

FOREIGN PATENTS

| Number | Country | Date |
|---|---|---|
| 663,441 | France | Apr. 8, 1929 |
| 127,755 | Germany | Jan. 29, 1902 |